Sept. 10, 1957 W. W. PHARIS 2,806,093

TELEPHONE TEST SELECTOR

Filed April 23, 1956 9 Sheets-Sheet 1

INVENTOR.
WILLIAM W. PHARIS

BY Henry H. Gay

AGENT

TELEPHONE TEST SELECTOR

Filed April 23, 1956 9 Sheets-Sheet 5

TELEPHONE TEST SELECTOR

Filed April 23, 1956 9 Sheets-Sheet 8

United States Patent Office 2,806,093

Patented Sept. 10, 1957

2,806,093

TELEPHONE TEST SELECTOR

William W. Pharis, Rochester, N. Y., assignor to General Dynamics Corporation, Rochester, N. Y., a corporation of Delaware Application April 23, 1956, Serial No. 580,039

8 Claims. (Cl. 179—175.2)

This invention relates to telephone systems in general and more particularly to test selectors for use in telephone systems.

In telephone offices providing a single test switch train for use in establishing special test or monitoring connections to subscriber lines within the office, it has been necessary to establish connections to subscriber lines by putting into the switch train groups of signals different from the directory number of the line to be tested in the case where the office includes both terminal per station and terminal per line type switch equipment operated on a uniform numbering basis. Thus it may be necessary to instruct the originating operator who controls the establishment of connections in such systems to omit the final (ringing code selection) digit in establishing connections to terminal per line type stations, and to omit certain canceled digits in the number of terminal per station type connections. Such procedure is objectionable for many reasons, including the requirement that operators have an increased degree of skill and the fact that there is an increased possibility of error in establishing connections.

Accordingly, it is an object of my invention to provide a new and improved test switch train.

Another object of my invention is to provide a test selector capable of absorbing the ringing selection digit of a called subscriber's line when a connection has been established to a terminal per station type line.

Another object of my invention is to provide a test selector capable of absorbing certain preliminary digits in a subscriber line number.

I achieve these and other objects by providing in a telephone system comprising pluralities of lines of first and second classes, means comprising a test selector and succeeding test switch trains for establishing connections to any one of the lines. The test selector includes means effective upon the establishment of a connection to the line to be tested for carrying out a series of tests for fault conditions. The succeeding switch trains include first and second test connectors for establishing connections from the testing apparatus to any one of the lines in the first and second pluralities of lines, respectively.

The test selector includes means for repeating a sequence of directive signals transmitted from the operator position. Each directive signal comprises a train of one or more impulses. Means within the selector comprising a switch is responsive to certain repeated signals for selectively seizing and establishing a connection to either of the switch trains. The test connector includes means responsive to seizure by the test selector and to subsequently repeated signals sent forward from the repeating means for directively operating a selected switch train including its test connector. The test selector comprises other means operative in response to the selection of the switch train including the first test connector for rendering the repeating means inoperative subsequent to the transmission of the final directive signal to the test connector in order to absorb any signal transmitted to the repeating means following the establishment of a connection from the testing apparatus to the line to be tested. The test selector also includes means operative in response to an operation of the test selector switch during the course of establishing a connection through the switch train including the second connector for rendering the above referred to other means inoperative, so that an indefinite number of signals transmitted to the selector may be repeated into the switch train including the second connector.

Further objects and advantages of my invention will become apparent as the following description proceeds. The points of novelty which characterize my invention are set forth with particularity in the claims annexed to and forming a part of this specification. For a better understanding of the description, reference may be had to the accompanying drawings in which:

Figs. 3–10 show a test selector; and

Fig. 11 shows the order in which Figs. 3–10 are to be arranged.

Figure 1A:
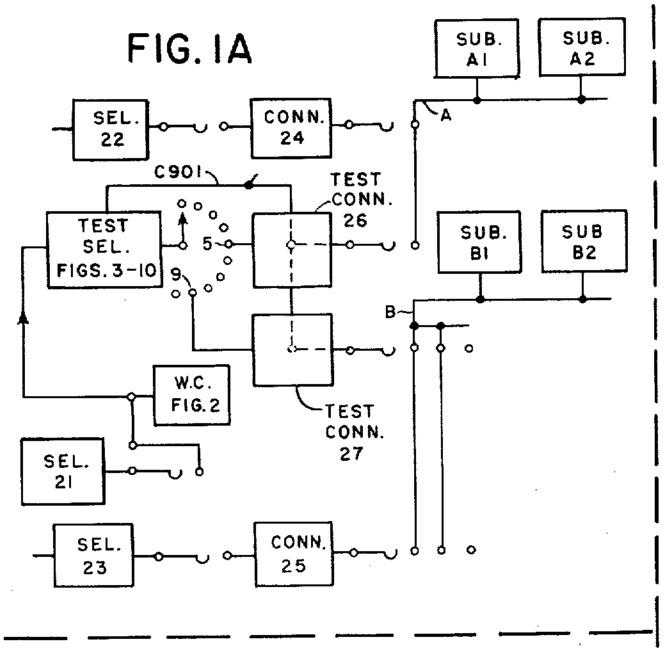
Figs. 1A and 1B show a block diagram of systems in which the test selector can be incorporated.

In the following description and on the drawings, the the first digit of the numerical designation of each relay or relay contact described will have the same numerical value as the figure number of the drawings in which such relay or relay contact is shown and therefore specific reference to various figures of the drawings will be made only when required for special reasons, such as when referring to elements not included in the numbering scheme.

The apparatus referred to in the following description is made to function from power supplied from a source such as a battery. The most positive terminal or plate of the battery is connected to ground and is referred to hereafter as "ground" and in the drawings as (+). The most negative, ungrounded terminal or plate of the battery is referred to as "battery" and in the drawings as (−).

*Extension of a call to the test selector*

Figure 2A:
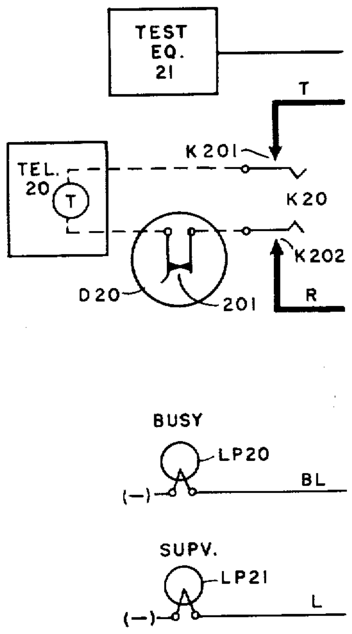
Figs. 2A and 2B are a wire chief position and a selector, respectively, which have access to the test selector.

Referring to the system of the type specifically shown in the block diagram of Fig. 1A, in the event that a connection is to be extended to a line to be tested from the wire chief's position such as the one shown in Fig. 2A, seizing means such as key K20 is operated thereby completing a connection for operating hunt sleeve relay 340 in the test selector which is shown schematically in Figs. 3–10. The operating circuit is traced as follows: from ground through the upper winding of relay 340, break contacts 301, conductor T, make contacts K201, transmitter T of the wire chief's telephone 20, dial contacts D201, make contacts K202, conductor R, break contacts 313, the lowering winding of relay 320 to battery. Relay 340 thereupon operates. The operation of relay 340 is effective for closing an operating circuit for calling bridge relay 320 that is traced from ground, through the upper winding of relay 320, break contacts 311, make contacts 342 and 341, conductor T, contacts K201, transmitter T, contacts 201 and K202, conductor R, break contacts 313, and the lower winding of relay 320 to battery. Relay 320 operates. Current flowing in its operating circuit is effective for energizing transmitter T.

The operation of relay 320 is effective for causing the seizure of the test selector by completing an operating circuit for release delay relay 510. This circuit is traced from ground through make contacts 321 and the winding of relay 510 to battery. The application of ground through make contacts 321 to conductor BL is also effective for energizing busy lamp LP20 over an obvious circuit. The operation of relay 320 is also effective for preparing an energizing circuit for the operating magnets of succeeding switches at make contacts 421.

The operation of relay 340 is effective for establishing an operating circuit for calling bridge relay 320 which is traced as follows. The aforesaid operation of relay 510 is effective for operating and locking relay 340 in its operated position from ground through make contacts 611 and 445 and the lower winding of relay 340 to battery. Relay 340 thereafter remains operated so long as relay 510 is held in its operated condition.

The operation of relay 510 is also effective for operating primary delay relay 530. The operating circuit is traced as follows: from ground through make contacts 611, break contacts M103, optional wiring A1 and the lower winding of relay 530 to battery. Relay 530 thereupon operates. The operation of relay 510 is also effective for closing an obvious operating circuit for release delay repeater relay 400 at make contacts 611.

Figures 4, 11:
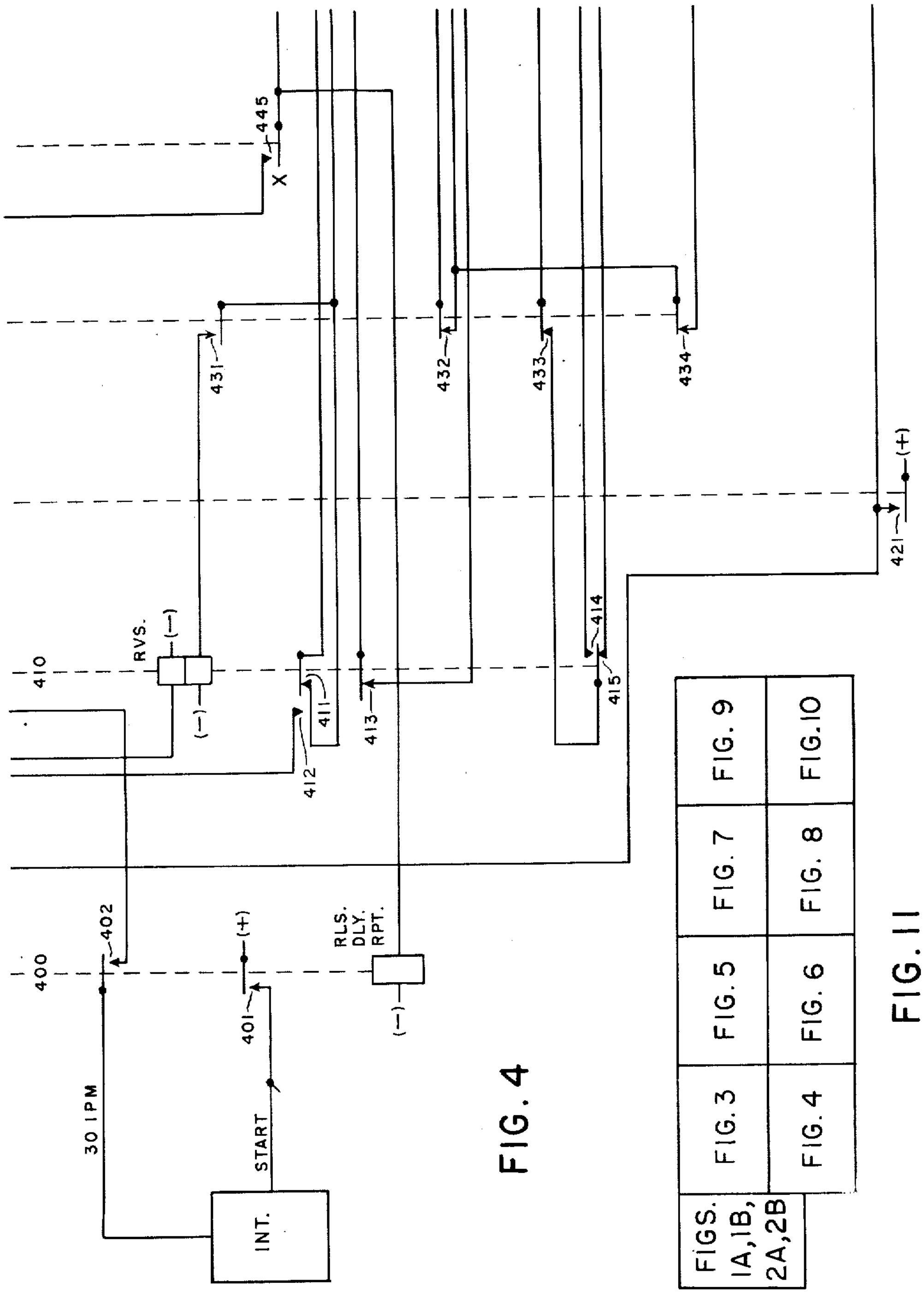
Figure 5:
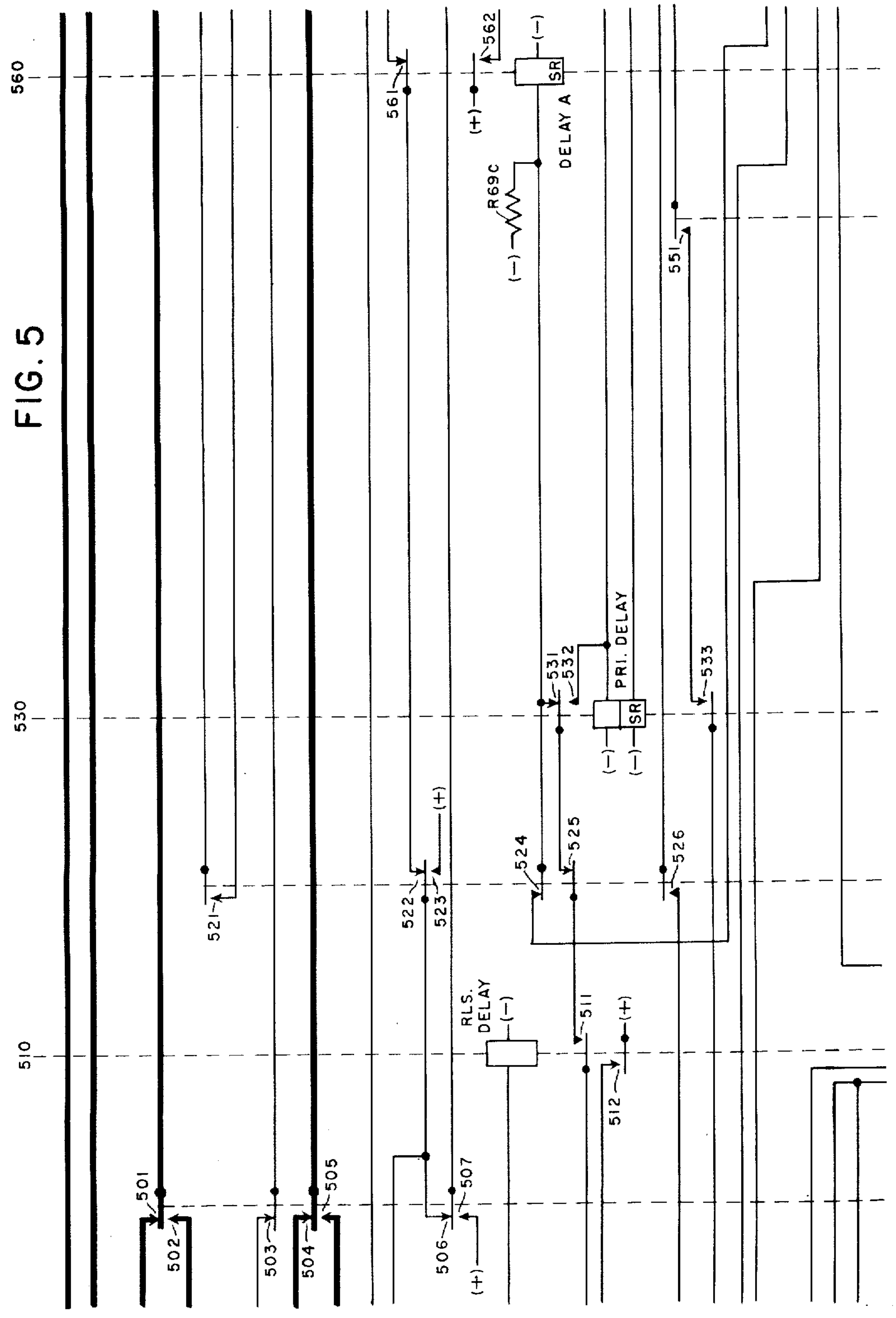
Figure 6:
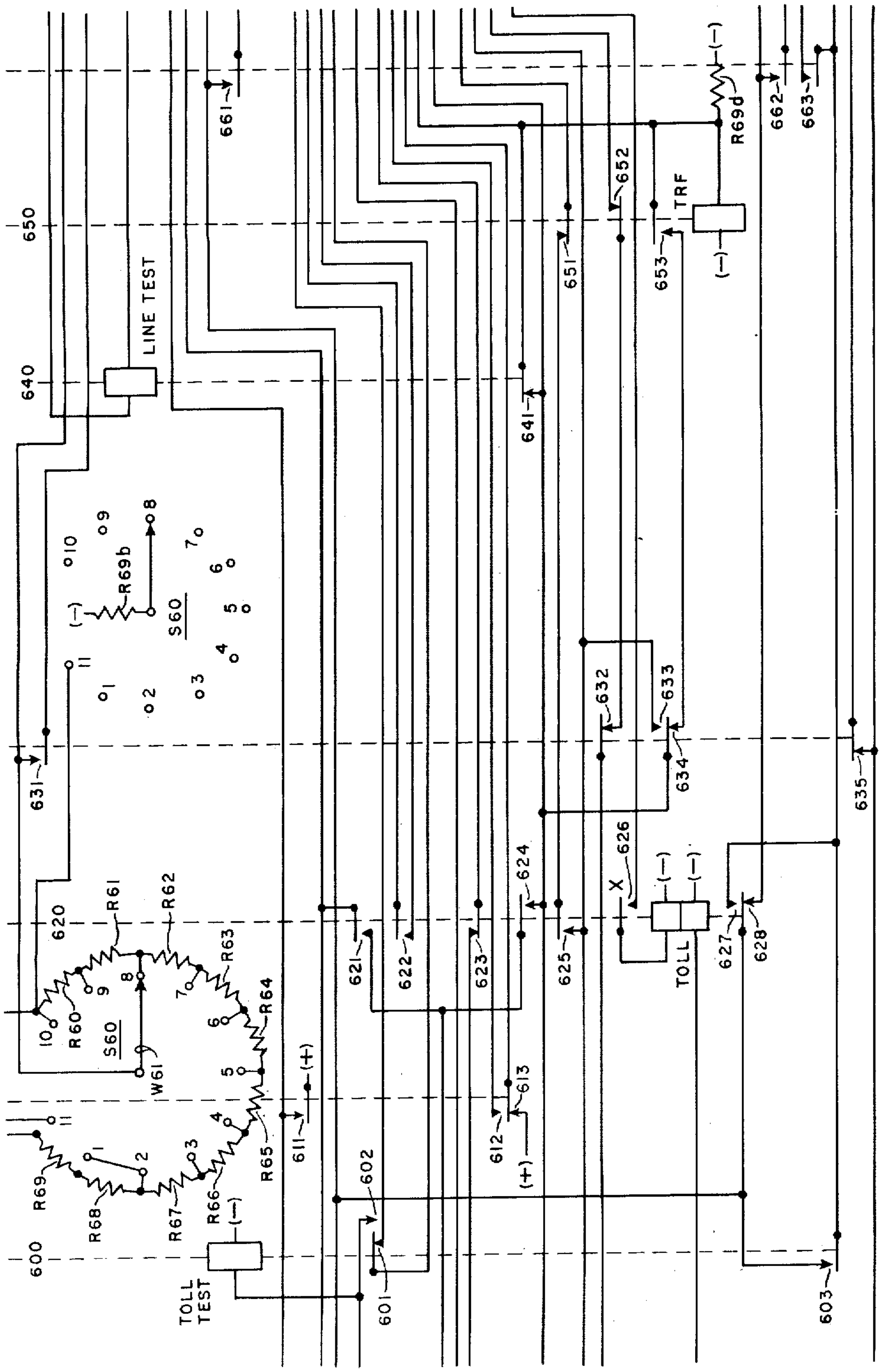
Figure 7:
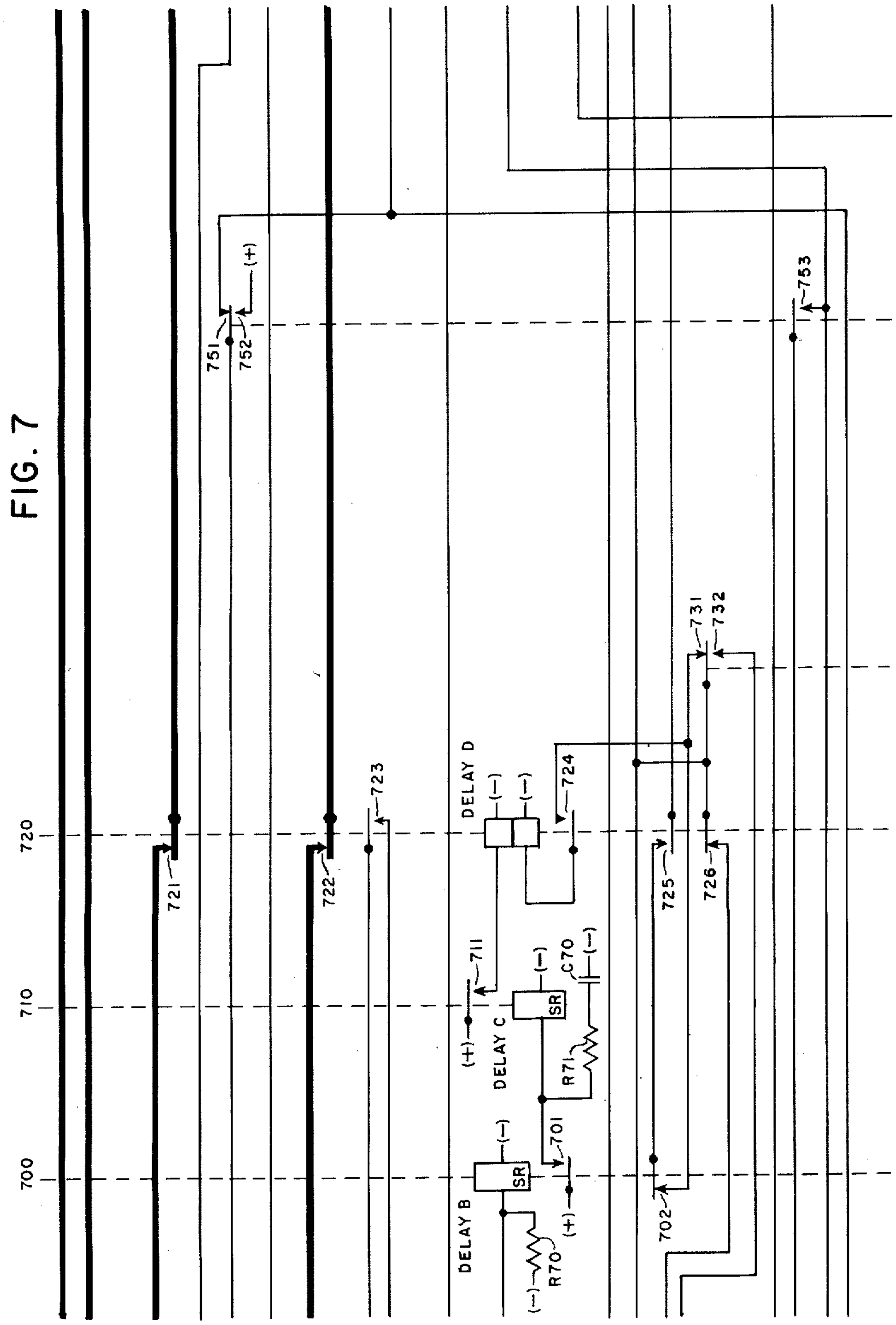
Figure 8:
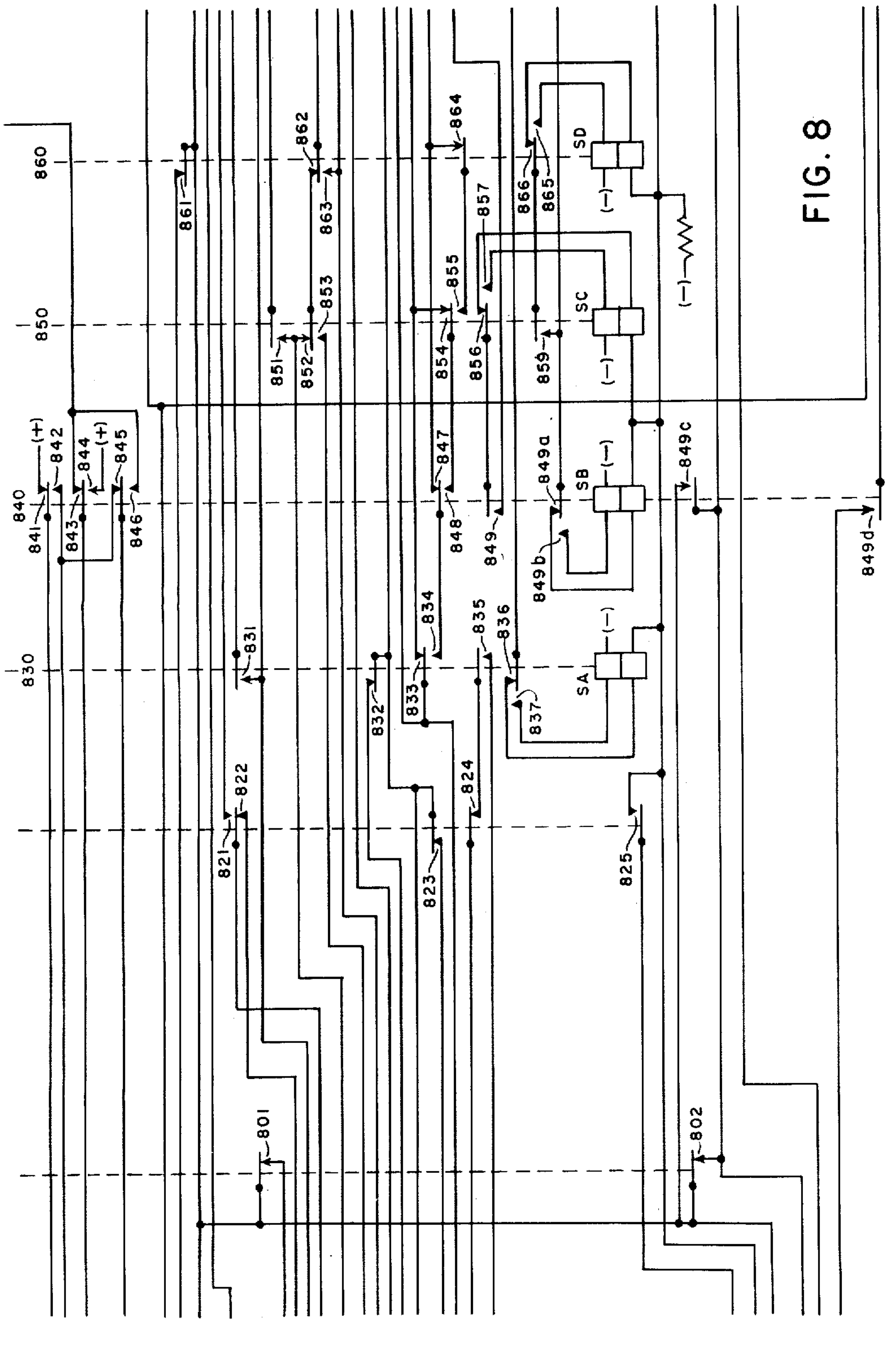
Figure 9:
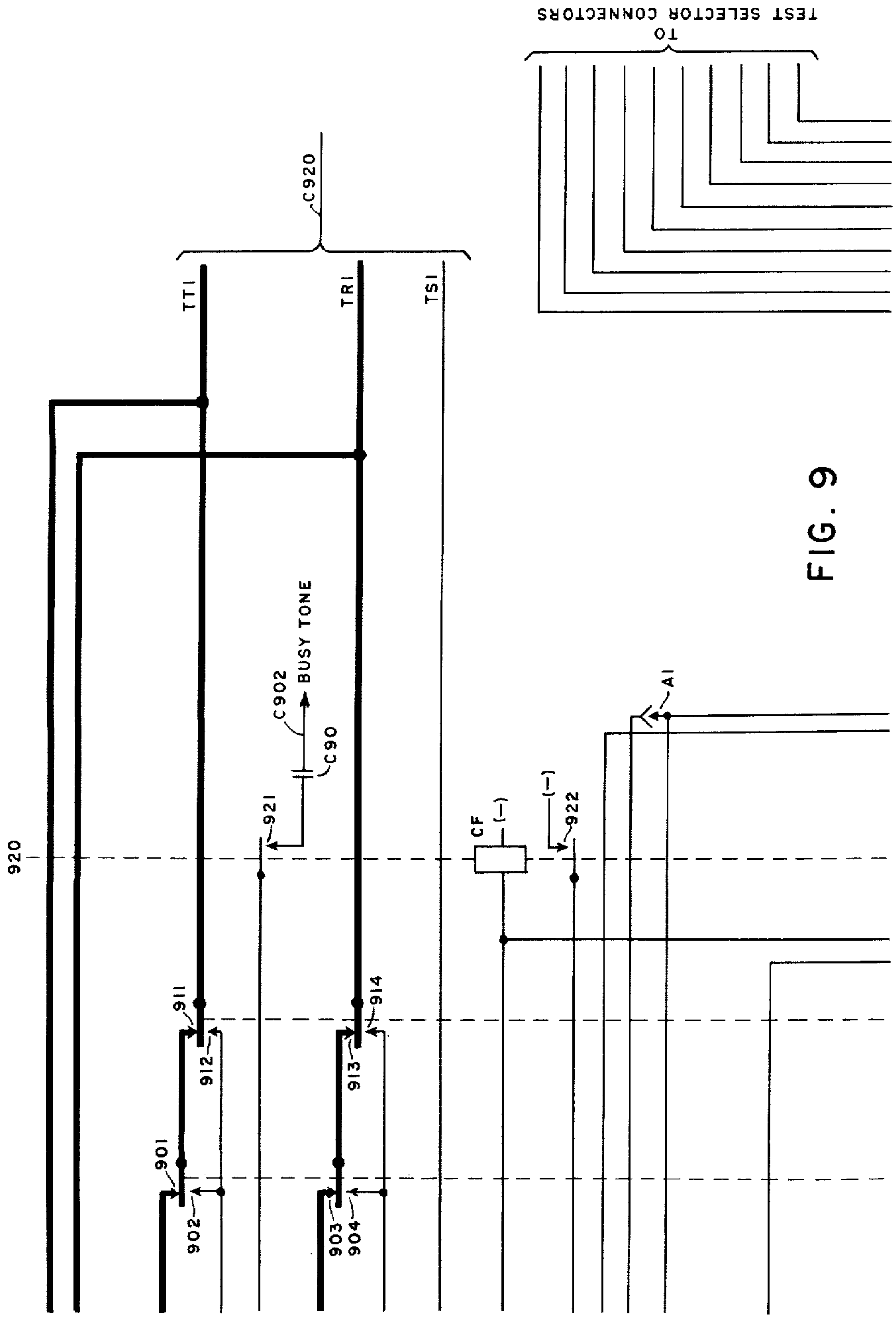

The operation of relay 400 is effective for opening the above traced operating circuit for the upper winding of relay 340 at break contacts 301, and for applying ground to the start conductor of the interrupter circuit common to the telephone exchange at make contacts 401. Thereafter, the interrupter is effective for placing busy tone on conductor C902 by means not shown and for also producing 30 impulse per minute ground signals which are transmitted to the selector over conductor 30 IPM (Fig. 4).

The operation of primary delay relay 530 is effective for preparing an operating circuit for the motor magnet M10 of the switch included in the selector, and a holding circuit for itself at make contacts 532.

*Extending a connection from the test selector to a line*

In order to establish a connection between the wire chief's test apparatus such as test equipment 21 and a line to be tested such as D, dial D20 is operated a number of times to transmit a sequence of signals corresponding to the digits of the directory number of the line to be tested. Each signal comprises one or more impulses in the form of a series of interruptions in the previously traced operating circuit of calling bridge relay 320. Each such signal corresponds to one of the digits which designates the line to which a test connection is to be established. For the present, it is assumed that each line, both terminal per station and terminal per line types, has a four digit directory number.

Figure 1B:
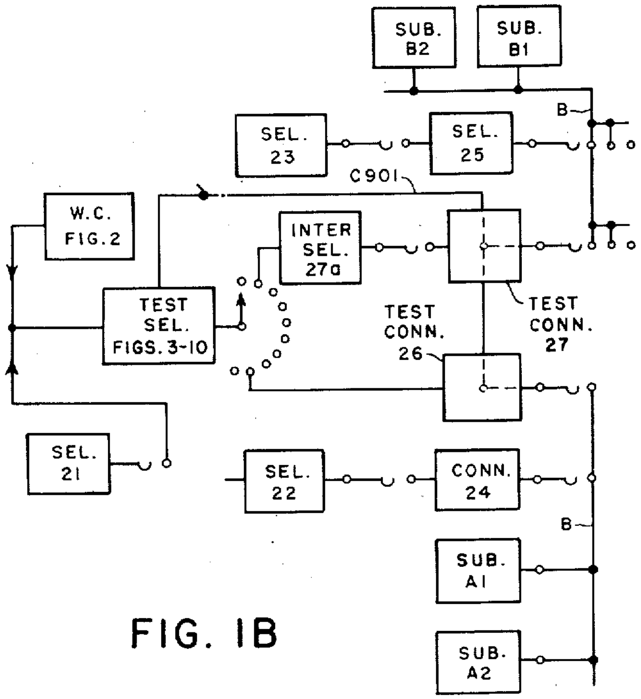
Figure 2B:
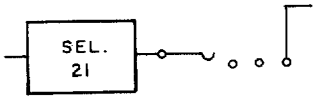
Figure 3:
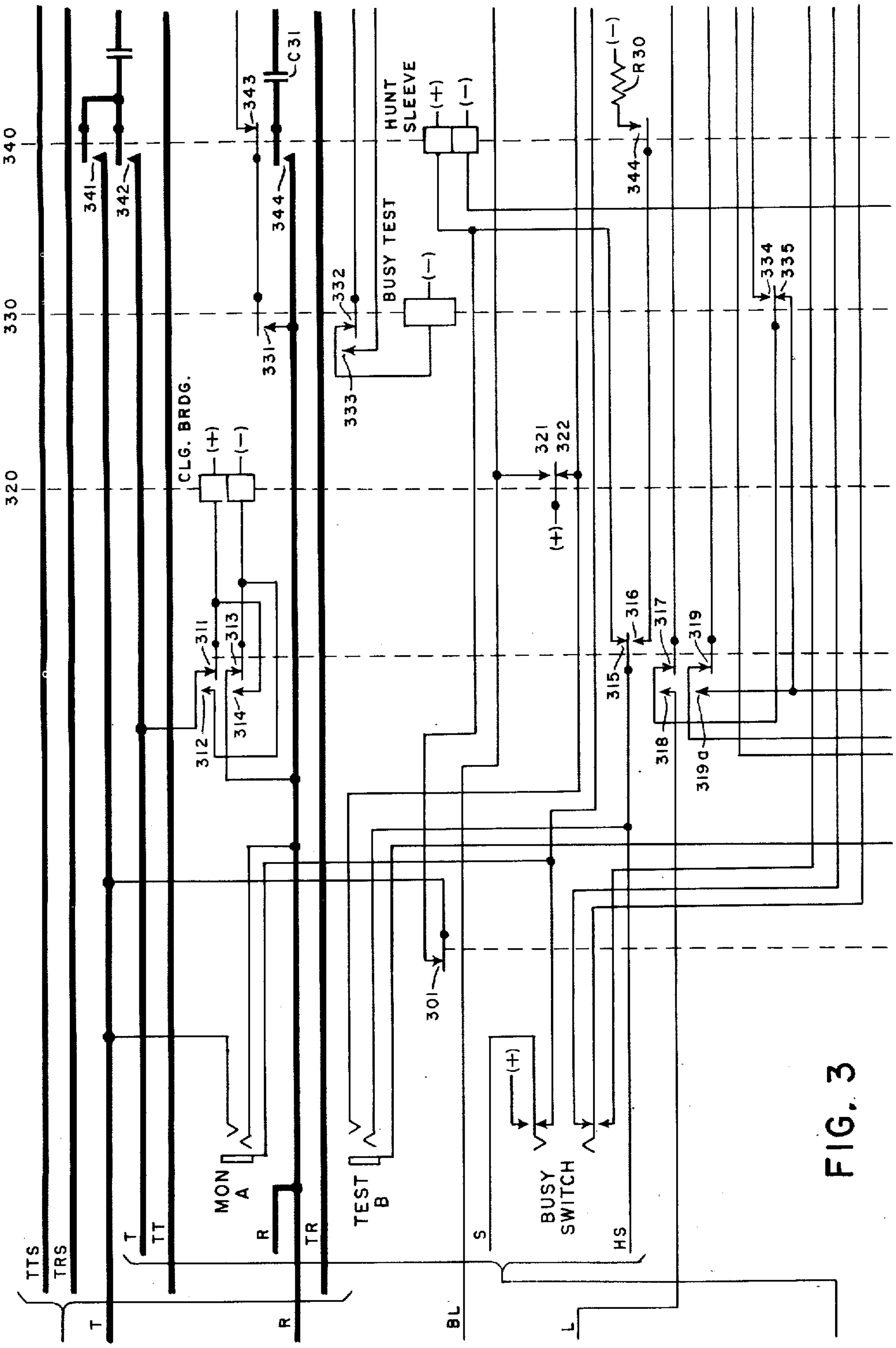

While the following description is concerned with the extension of a connection from the wire chief's position, it is to be understood that a connection may be extended to any one of the lines to which test connectors such as 26 and 27 have access from a selector such as 21, shown in Figs. 1A and 1B. Such a connection is extended in substantially the same manner as the one to be described.

*Operation of the test selector switch.*—In response to the transmission of a train of impulses from dial D20, relay 320 functions as a means for repeating such signals to the test selector switch and to test connectors thereafter selected by the selector switch. Relay 510, being a slow release type, is maintained in its operated condition throughout the pulsing operation of relay 320 even though its operating circuit is momentarily interrupted by the opening of make contacts 321 for the time that relay 320 is released during each impulse.

In response to each release of relay 320 during the transmission of the first train of impulses, a circuit for energizing the means for advancing the wipers of the switch within the selector is completed from ground through break contacts 322, make contacts 511, break contacts 525, make contacts 532 and motor magnet M10 to battery. Each energization of motor magnet M10 (Fig. 10) is effective for moving wipers W10 and W11 of the selector switch one step in the direction away from their normal positions and into successive engagement with the terminals in the Top and Bottom banks, respectively, to which the wipers have access.

Upon the first energization of motor magnet M10 and the advance of the wipers W10 and W11 away from their normal positions, off-normal contacts associated with the switch are operated. Thus, break contacts M103 are opened to open the above traced operating circuit for the lower winding of delay relay 530. Owing to its slow release nature, relay 530 is thereafter maintained in its operated position throughout the transmission of the first train of impulses by the intermittent energization of its upper winding from ground through the impulsing break contacts 322, make contacts 511, break contacts 525, make contacts 532 and the upper winding of relay 530 to battery.

At the conclusion of the transmission of the first signal or digit from the wire chief position, relay 320 comes to rest in its operated position so that the above traced holding circuit comprising the upper winding of relay 530 is opened at break contacts 322. Relay 530 thereafter releases. Wipers W10 and W11 are now in engagement with the terminal set corresponding to the number of impulses in the directive signal repeated by relay 320. The release of relay 530 is effective at this time for disconnecting the above traced connection from impulsing contacts 322 to motor magnet M10 at make contacts 532, and for further preparing the above referred to impulsing circuits for succeeding switches comprising make contacts 421 on relay 320 at break contacts 635.

*Digit absorbing operation.*—Referring to the telephone system shown in Fig. 1A, a first class of switch trains comprising selector 22 and connector 24 has access to subscriber lines, including line A, which are terminated in the multiple to which connector 24 and test connector 26 have access on a terminal per line basis. Similarly, a second class of switch trains comprising selector 23 and connector 25 has access to subscriber lines, including line B, which are terminated in the multiple to which connector 25 and test connector 27 have access on a terminal per station basis. In order to maintain a uniform numbering system, i. e., maintain the same number of digits in the directory number of each line regardless of the basis on which the line is terminated, it is necessary to provide means within the second class of switch trains for absorbing certain intermediate digits. Assuming each directory number has four digits, in the case of connections extended over the terminal per line type switch train, selector 22 is operative in response to a first digit for selecting a connector, such as 24. Connector 24 is thereafter responsive to the next two succeeding digits for selecting the required subscriber line, such as A, and is responsive to the transmission of the fourth and final digit for operating means within connector 24 in order to select the type of ringing suitable for signaling the required party on subscriber line A, such as station A1. In the case of connections extended over the terminal per station type switch train, selector 23 may absorb the first digit of the called station designation and thereafter respond to the transmission of a second digit for selecting a connector, such as 25. Connector 25 thereafter responds to the remaining two signals of the subscriber station identification to select the one of the group of terminals on which line B appears. The selection of terminals is also effective for choosing a signal to be transmitted over line B in order to signal the required station, such as B1.

Thus, it is apparent that in order to extend connections to terminal per line type lines, such as A, the test selector shown in Figs. 3–10 must select the required test connector in response to the transmission of a first digit of a directory number from the operator position, thereafter direct the test connector, such as 26, into engagement with the required terminals of the subscriber line in response to the succeeding two digits and absorb the final ringing selecting digit. In the case of connections extended to terminal per station type lines, such as B, the test selector must absorb the first digit of the called subscriber line directory number, select the required test connector, such as 27, in response to the transmission of the second digit, and thereafter advance the test connector to the terminal of the required line B and the substation to which a test connection may be established. For operation under these conditions, the selector shown in Figs. 3–10 is supplied with the indicated A and A1 wiring options. The B wiring options are omitted.

*Extending a connection to a terminal per line type line*

Assuming that a connection is to be extended from the test apparatus in the test selector to one of the terminal per line groups by way of a test connector, such as 26, shown in Fig. 1A connected to terminal 5 of the test selector switch, the transmission of the digit 5 to the signal repeater comprising relay 320 is effective for advancing wipers W10 and W11 of the selector into engagement with the terminal set in the previously described manner.

Upon the release of primary delay relay 530 in the previously described manner, a circuit is completed from impulse repeating contacts 421 to the motor magnet of the succeeding switch train. Thus, the repetition of further signals by relay 320 is effective to transmit corresponding signals to the succeeding test connector 26. The circuit for energizing its motor magnet is traced from ground through make contacts 421, break contacts 635 and 1036, wiper W11, conductor C1001, break contacts 1029 and wiper W10 to the conductor connected to the fifth terminal which, in turn, is connected to the input circuit of the test connector 26. Because the succeeding switch train does not form a part of the present invention, a detailed description of its operation is not included here.

After the test connector has been selected, means within the test selector is operative for counting the number of directive signals or digits transmitted to the succeeding switch train. The signal counting means is next described.

In response to each impulse repeating operation of relay 320 and the release of relay 530, delay means comprising delay relays A, B, C and D (560, 700, 710 and 720, respectively) are operated in the order named. The operating circuit of relay 560 is completed upon each release of relay 320 and is traced from break contacts 322, make contacts 511, break contacts 525 and 531, and the winding of relay 560 to battery. Relay 560 is a slow release type, and therefore remains operated throughout each impulsing operation of relay 320. The operation of relay 560 is effective for closing an obvious operating circuit for relay 700 at make contacts 562. Relay 700 thereupon operates. The operation of relay 700 is, in turn, effective for closing an obvious circuit for operating relay 710 at make contacts 701. Relay 710, in turn, operates to close operating circuit for relay 720 at make contacts 711. Relay 720 thereupon operates. At the conclusion of the impulse repeating operation of relay 320, relay 320 comes to rest in operated condition, thereby opening the operating circuit for relay 560 at break contacts 332 for an interval of time sufficient to allow relay 560 to release. The release of relay 560 thereupon brings about the release of relays 700, 710 and 720 in the order named by opening the above described operating circuits.

The operation of the off-normal springs of the switch included in the test selector is effective for preparing digit or signal registering means comprising relays 830, 840, 850 and 860 for operation by extending ground to one of the terminals of the lower windings of those relays. The circuit is traced from ground through make contacts 611 and M102 and break contacts 1022 to the winding terminals.

In response to the transmission of the first signal succeeding the single signal which was effective for operating the test selector switch and to the operation of relay 560 in the above described manner, an operating circuit is completed for pulse A relay 1000. This circuit is traced from ground through make contacts 611, M102 and 661, break contacts 1027 and 833, and the winding of relay 1000 to battery. Relay 1000 thereupon operates.

At the conclusion of this first signal succeeding the signal effective for operating the selector switch, relay 830 is operated to register the receipt of the signal. The operation of relay 830 is next described. Following the repeating operation of relay 320, relay 560 releases in the previously described manner and is effective for opening the above traced operating ground for relay 1000 at make contacts 661. In response to the removal of ground from the operating circuit of relay 1000, a holding circuit is extended from battery through the winding of relay 1000, make contacts 1002, break contacts 836, and the lower winding of relay 830 to the previously described ground connection. Current flowing in the holding circuit is sufficient to operate relay 830 to the point where make contacts 837 close. The closing of contacts 837 completes an operating circuit which is effective for operating the rest of the contacts on relay 830. The latter circuit is traced from battery through the upper winding of relay 830, make contacts 837, and the lower winding of relay 830 to the previously described ground supply extended to the lower right-hand terminal of the relay 830 winding.

The resulting operation of relay 830 is effective for opening the above traced holding circuit for relay 1000 at break contacts 836. Relay 1000 thereupon releases. The operation of relay 830 is also effective for transferring the above traced energizing circuit for relay 1000 comprising make contacts 611 from its connection to the winding of relay 1000 at break contacts 833 to the winding of pulse B relay 1010 at make contacts 834.

Upon the impulsing operation of relay 320 in response to the transmission of the second signal following the transmission of the signal effective for operating the test selector switch and to the operation of relay 830, an energizing circuit for relay 1010 is completed from ground through make contacts 611, M102 and 661, break contacts 1027, make contacts 834, break contacts 847, and the winding of relay 1010 to battery. Relay 1010 thereupon operates.

At the conclusion of the impulsing operation of relay 320, relay 840 is operated to register the receipt of the signal. The process by which relay 840 is operated is next described. Following the repeating operation of relay 320, relay 320 comes to rest in its operated condition, releasing in the previously described manner relays 560, 700, 710 and 720. The release of relay 560 is effective for opening the above traced energizing circuit for relay 1010 at make contacts 661. Upon the removal of ground from the right-hand terminal of the winding of relay 1010, a holding circuit for relay 1010 and a circuit for operating relay 840 sufficiently to close make contacts 849*a* is completed. This circuit is traced from battery through the winding of relay 1010, make contacts 1011, break contacts 849*a*, and the lower winding of relay 840 to battery. The closing of contacts 849*b* completes a circuit for operating itself fully. The latter circuit is traced from battery through the upper winding of relay 840, make contacts 849*b*, the lower winding of relay 840 to ground supplied to the right-hand terminal of the lower winding over the previously described circuit. The complete operation of relay 840 is effective for opening the holding circuit of relay 1010 at break contacts 849*a*. Relay 1010 thereupon releases. The operation of relay 840 is also effective for transferring the above described ground supply for relay 1010 comprising make contacts 661 from its connection to the winding of relay 1010 at break contacts 847 into connection with the winding of relay 1000 at make contacts 848.

Assuming that the two signals or digits transmitted to the succeeding test connector, such as 26, are effective for advancing the wipers of the connector to the terminals of the line on which tests are to be performed, no further directive signals are required to be transmitted to the test connector. Therefore, the signal registering means including relays 830, 840, 850 and 860 is effective for rendering the impulse repeating means inoperative to repeat subsequently received impulses to the succeeding switch. To this end, the operation of relay 840 is effective for closing make contacts **849*d*, thereby shorting out the impulsing contacts 421. The shorting circuit is traced from ground through make contacts 611, break contacts 1046, and make contacts 849*d* to the upper half of make contacts 421**.

With the means for making the impulsing means inoperative in its effective condition, the transmission of the final digit of the directory number of the line to which a test connection is to be extended and the resulting impulsing operation of relay 320 is ineffective for causing an impulsed ground to be transmitted from contacts 421 forward over the previously traced circuit comprising wipers W11 and W10 to the succeeding test connector.

The last described impulsing operation of relay 320 is also effective for causing the operation of relay 850 to register the receipt of the final directory digit of the line to be tested. Thus, during the transmission of the signal, relay 1000 operates from ground through make contacts 611, M102 and 661, break contacts 1026, make contacts 834 and 848, break contacts 854, and the winding of relay 1000 to battery. Relay 1000 thereupon reoperates and closes a locking circuit for itself and prepares an operating circuit for relay 850 which is effective to close contacts 857. At the end of the impulsing operation, relay 560 releases in the previously described manner to open the energizing circuit for relay 1000 at make contacts 661. The operating circuit for relay 850 is thereupon effective. The latter circuit is traced from battery through the winding of relay 1000, make contacts 1002, break contacts 1042, make contacts 849, break contacts 856, and the lower winding of relay 850 to the previously described ground connection extended to the lower, left-hand terminal of relay 850 winding. The closure of contacts 857 is effective for completing an operating circuit for relay 850 which will operate the remaining relay 850 contacts. This latter circuit is traced from battery through the upper winding of relay 850, make contacts 857, and the lower winding of relay 850 to the previously described ground connection. The operation of relay 850 is effective for opening the holding circuit for relay 1000 at break contacts 856. Relay 1000 thereupon releases.

*Cut-through operation.*—Upon the registration of the last signal or digit of the directory number of the line to which a test connection is to be extended in the signal counting means, testing apparatus within the selector is connected to conductors TT1 and TR1. The connecting process is started by the operation of relay 850 which completes an operating circuit for toll relay 620. The operating circuit is traced from ground through make contacts 611 and M102, break contacts 801 and 601, make contacts 821 on still operated relay 720, break contacts 1023, make contacts 851, break contacts 434 and the lower winding of relay 620 to battery. Relay 620 thereupon operates and closes a locking circuit for itself from ground through make contacts 611 and M102, break contacts 861, make contacts 621, break contacts 832 and 834, and the lower winding of relay 620 to battery. The operation of relay 620 is effective for completing an operating circuit for CF relay 920.

The operating circuit of relay 920 is traced from ground through make contacts 611 and M102, break contacts 861 and 411 in parallel, make contacts 621 and 624, break contacts 1025, and the winding of relay 920 to battery. The operation of relay 920 is effective for closing a holding circuit for itself from battery through the winding of relay 920, make contacts 1021, M102 and 611 to ground.

The operation of relay 920 is effective for opening the previously traced ground connection to the lower windings of relays 830, 840, 850 and 860 at break contacts 1022, thereby opening the previously traced locking circuits for relays 830, 840 and 850. The latter relays release at this time.

The test selector is now in condition to begin its cycle of routine tests which are to be described presently.

*Extending a connection to a terminal per station type line*

Referring to Fig. 1A, in the preferred embodiment of my invention, when a connection is to be extended from the wire chief's position to a terminal per station line, such as B, it is necessary to absorb the first digit of the directory number of the line to be tested. Assuming that all terminal per station lines have a common first digit, such as "2," the test selector is arranged to recognize such first digits by a distinctive marking found on the corresponding bank terminal of the test selector switch after its wipers have been advanced in response to the transmission of the first line designation digit or signal.

In order to absorb the first transmitted directory number digit of a terminal per line line, the wipers W10 and W11 of the selector switch are advanced in the previously described manner to the top and bottom terminal set corresponding to the first digit. Upon the release of primary delay relay 530 in the previously described manner and in response to the advance of wiper W11 to the second terminal in the Bottom bank, a circuit is completed for energizing means comprising digit adding relay 1040 for causing the selector switch to drop back to its normal position. This energizing circuit is traced from ground through make contacts 421, break contacts 635 and 1036, wiper W11, conductor C1002, break contacts 1028, and the winding of relay 1040 to battery. Relay 1040 thereupon operates and closes a locking circuit for itself. The locking circuit is traced from ground through make contacts 611 and 1045, break contacts 1028, and the winding of relay 1040 to battery.

The operation of relay 1040 is effective for closing a circuit for energizing release magnet MZ10 of the selector switch. The circuit is traced from ground through A wiring, make contacts 1041, break contacts 1031, make contacts 612 and M101, and the winding of magnet MZ10 to battery. The energization and operation of magnet MZ10 restore the wipers W10 and W11 to their normal position and the switch off-normal springs to normal condition.

The restoration of the off-normal springs to normal condition is effective in response to the operation of relay 1040 for closing a circuit for operating digit canceling relay 1030. The circuit is traced from ground through make contacts 611, break contacts M103 and 1032, the A wiring, make contacts 1044, and the winding of relay 1030 to battery. Relay 1030 thereupon operates and closes a locking circuit for itself from ground through make contacts 611 and 1033, A wiring, make contacts 1044, and the winding of relay 1030 to battery. The restoration of the off-normal springs also is effective for reclosing the previously traced operating circuit for primary delay relay 530 at break contacts 103. Relay 530 thereupon reoperates to prepare the circuit for motor magnet M10 in the previously described manner.

The subsequent transmission of the second directory number digit is effective to advance wipers W10 and W11 in the previously described manner into engagement with a test connector such as 27 which is terminated on the terminal set corresponding to the second designation digit of the line to which a test connection is to be established. The transmission of the remaining directory number digits is effective for advancing the test connector wipers into engagement with the required subscriber's line. However, due to the operation of relay 1030, the previously traced impulsing circuit comprising break contacts 1036 and wiper W11 is replaced with a circuit traced from ground through the impulsing contacts 421, break contacts 635, make contacts 1035, break contacts 1029, and wiper W10 to test connector 27.

The transmission of the next two signals representing the remaining directory number digits is effective for operating the signal registering means in the previously described manner. Thus, relays 560, 700, 710 and 720 reoperate in response to the impulsing operation of relay 320. As a result, relays 1000 and 1010 are reoperated in response to alternate signals and operate signal counting relays 830 and 840. Upon the operation of relay 840 after the registration of the fourth and final subscriber line directory number digit, a circuit is completed for operating relay 850. The circuit is traced from ground over the previously described connection comprising break contacts 1022 through the lower winding of relay 850, break contacts 856, make contacts 849, 1043 and 1034, A wiring, and the lower winding of relay 1010 to battery. Relay 850 thereupon operates sufficiently to close make contacts 857, thereby establishing the previously described operating and holding circuit for itself, and releases relay 1010.

The operation of relay 850 closes the previously described operating circuit for relay 620 so that the latter relay operates. Thereafter a test apparatus associated with the selector is connected to conductors TT1 and TR1 in the manner previously described under the heading of "Cut-through operation."

*Access to subscriber lines having designations of five digits*

The test selector forming the preferred embodiment of my invention may be adapted for use in extending test connections to subscriber lines in a system having a uniform five digit numbering system. In order to adapt the test selector being considered here for such service, the A1 wiring option in the previously traced operating circuit of relay 530 is omitted. Thus, upon seizure from the wire chief position, relays 320, 510 and 400 are operated in the previously described manner. The above traced operating circuit for the primary delay relay 530, however, is opened by the omission of the A1 wiring option and is not operated at this time.

The transmission of the first signal of any subscriber line to which the subject circuit is to be extended is to be absorbed; therefore, upon transmission of such a first signal, the previously traced operating circuit for the motor magnet M10 of the test selector switch is opened at contacts 532, so that the switch is not advanced in response to such a first signal. In response to such a first signal, however, a circuit is completed for operating delay A relay 560 over the previously traced path. The operation of relay 560 brings about the operation of relays 700, 710, 720 in the previously described manner. At the conclusion of the transmission of the first signal or digit, relays 560, 700 and 710 release in the order named. However, relay 720 is maintained operated over a holding circuit which is traced as follows: from ground through make contacts 611, break contacts M102, make contacts 725, break contacts 702, make contacts 724, and the lower winding of relay 720 to battery.

The operation of relay 720 and the release of relay 700 are effective for completing an operating circuit for primary delay relay 530. The circuit is traced from ground through make contacts 611, break contacts M102, make contacts 725, break contacts 702 and 731, and the lower winding of relay 530 to battery. Relay 530 thereupon operates.

The operation of relay 530 is effective in the previously described manner to make the selector switch responsive to a subsequently transmitted signal or digit. Thereafter, the selector switch is effective for seizing one of the test connectors in the previously described manner. It is to be noted that the above traced locking circuit for relay 720 is opened by the operation of break off-normal contacts M103 upon advance of the selector switch away from its normal position. Consequently, relay 720 is released during the transmission of the second signal or digit corresponding to the second digit of the five digits subscriber line designation.

Thereafter, the call is further extended through the test connector in the previously described manner.

*Extending connections to lines where the terminal per station test train includes an intermediate selector*

Figure 10:
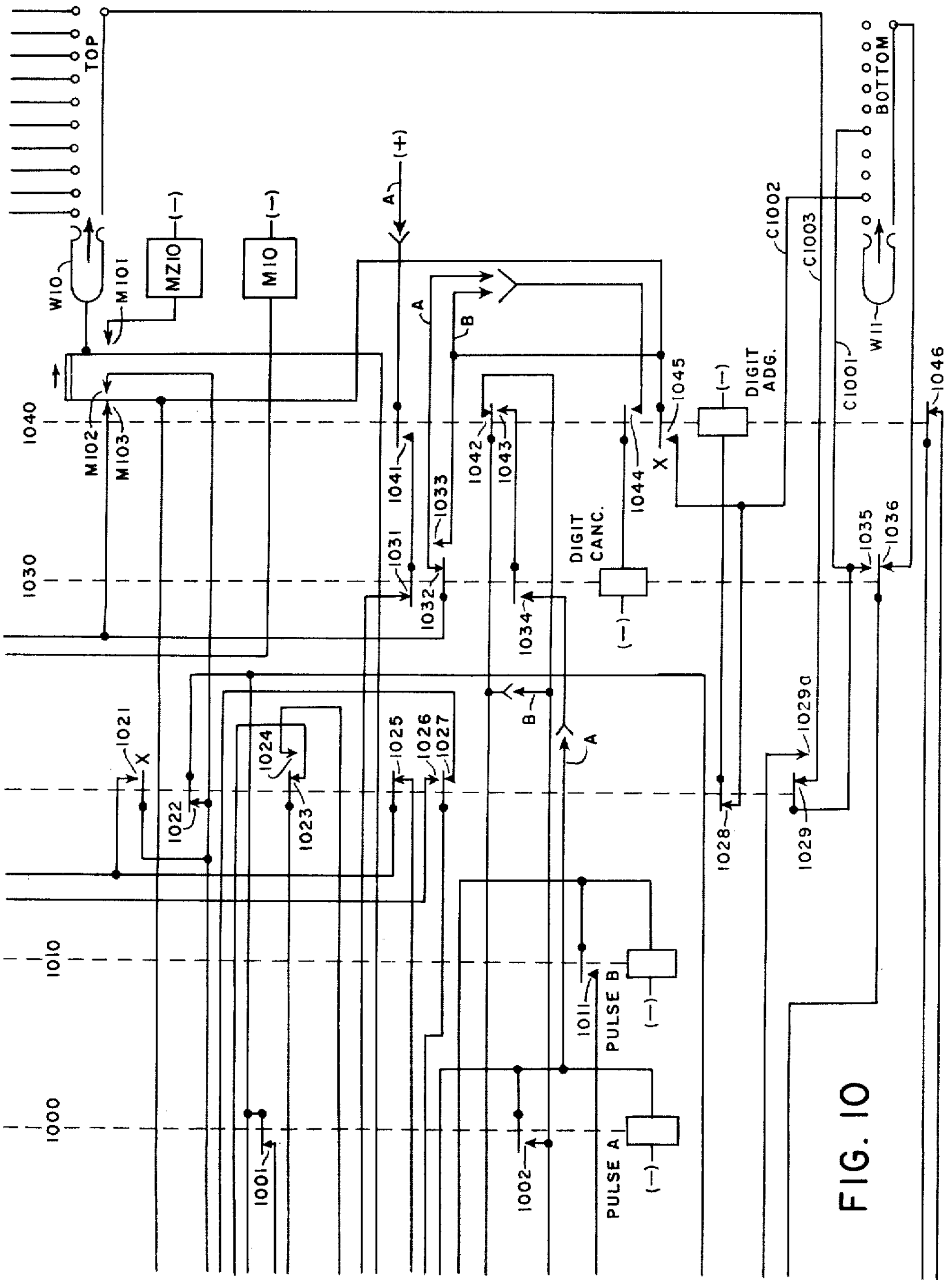

In the event that the test selector forming the preferred embodiment of my invention is to be incorporated in a telephone system wherein it is necessary to provide intermediate selectors between the terminals accessible to the test selector switch and the terminal per station test connectors, such as 27, an arrangement of apparatus, such as the one shown in Fig. 1B, is provided. When this arrangement is provided the A wiring options, shown in Fig. 10, are omitted and the B wiring options are included.

With this arrangement, subscriber lines having four digit directory numbers may be reached from the test selector where access to the subscriber lines is had over terminal per line type test connectors, such as 26, and terminal per station type connectors, such as 27.

Access is gained to the terminal per line type test connectors, such as 26, in the previously described manner, wherein the test selector switch responds to the first transmitted subscriber line designation digit and test connector 26 thereafter responds to the succeeding two subscriber line designation digits. The shortening means comprising contacts **849*d* on relay 840 for rendering the impulse repeating contacts 421** ineffective is operative in the previously described manner to absorb the final ringing selecting digit of the number of the subscriber line under test.

In the case of connections extended from the test selector to the terminal per station type line through a test connector such as 27, the transmission of the first line designation digit or signal is effective in the previously described manner to advance wipers W10 and W11 of the test selector switch to the terminals at which an intermediate selector such as **27*a* is terminated. Assuming that all such terminal per station lines have designations beginning with the digit "2," the advance of the wipers to the second terminal is effective for completing an operating circuit for means comprising relay 1040. The operating circuit of relay 1040 is traced as follows: from ground through make contacts 421, break contacts 635 and 1036, wiper W11, conductor C1002, break contacts 1028, and the winding of relay 1040 to battery. Relay 1040 thereupon operates and completes for itself the previously traced locking circuit including make contacts 1045**.

The operation of relay 1040 is thereupon effective for operating relay 1030 by completing the following circuit: from ground through make contacts 611, the B wiring, make contacts 1044, and the winding of relay 1030 to battery. Relay 1030 thereupon operates.

The operation of relay 1030 is effective to extend an impulsing circuit from ground through make contacts 421, break contacts 635, make contacts 1035 and wiper W10 to the conductor connected to the intermediate selector **27*a*. The operation of relay 1040 is effective in the previously described manner for preventing the operation of the means for short circuiting the impulsing contacts comprising 421 at break contacts 1046** and thereby prevents the digit counting means from absorbing trains of impulses succeeding the second train after the digit counting means has become effective.

The further extension of a connection from the test selector forming the preferred embodiment of my invention to the line to be tested takes place in the previiously described manner. Thus, in the system shown in Fig. 1B, the transmission of second, third and fourth signals to the repeating means comprising relay 320 is effective for causing repeated signals to advance the succeeding test selector **27*a* and test connector 27**.

*Testing line to which a connection has been extended*

The description thus far has considered only the manner in which a connection is extended from the test selector to test connectors having access to the lines to be tested. Subsequent to the extension of the wipers of a test connector switch to the terminals of the line to be tested, means within the test selector is effective for conducting series of tests for foreign E. M. F. on either conductor of the line and leakage resistance between the conductors of the line, or each conductor and ground. The operation of the test selector leading up to these tests and the tests themselves are next described.

*Busy test.*—Following the extension of a connection from the test selector to the wipers of a test connector over conductors TT1, TR1 and TS1, shown compositely as conductors C901, the test selector conducts a test to determine whether or not a busy condition exists on the line to be tested. Such a busy condition is indicated by the presence of ground on the multiple conductor of the line under test which is connected to conductor TS1 by the corresponding wiper of the test connector. An idle condition is indicated by the absence of such a ground.

Following the transmission of the line designation digit or signal which is effective to advance the test connector wipers into engagement with the line conductors and during the time that relays 560 and 620 are released and relay 720 is still operated, a circuit for busy test relay 330 is prepared. The circuit extends from conductor TS1 through break contacts 506, 522 and 561, make contacts 723, break contacts 332 and the winding of busy test relay 330 to battery. The presence of ground on conductor TS1 is effective for operating relay 330. The absence of ground on conductor TS1 allows relay 330 to stay in its normal condition. The subsequent release of relay 720 is effective for opening the circuits between conductor TS1 and the winding of relay 330 so that the relay may not thereafter be operated over this path.

Assuming that the line is busy and that relay 330 has operated, the operation of relay 330 is effective for closing a locking circuit for itself from conductor TS1 through make contacts 333 and the winding of relay 330 to battery. The operation of relay 330 is also effective for opening the previously traced operating circuit of relay 620 at break contacts 434, whereby relay 620 is prevented from operating in the previously described manner.

The operation of relay 330 is also effective for completing an operating circuit for reverse relay 410. This circuit is traced as follows: from ground through make contacts 611, M102 and 431, and the lower winding of relay 410 to battery. Relay 410 thereupon operates, reversing the direction of the flow of current in the previously described operating circuit for relay 320 over the loop comprising the wire chief telephone TEL20. This reversal is without effect at this time. The operation of relay 420 also transfers incoming conductor HS which extends to the multiple bank of selector 21 from its connection to ground through the upper winding of hunt sleeve relay 340 at break contacts 315 to a battery through make contacts 316 and 344 and resistor R30, for reasons that are to be explained presently. The operation of relay 410 is also effective for operating CF relay 920 as soon as SC relay 850 has been operated in the previously described manner. The circuit is traced as follows: from ground through make contacts 611, M102, 412 and 753, and the winding of relay 920 to battery.

The operation of relays 920 and 330 are effective for extending a busy tone to the conductor R in order to inform the listener at the wire chief position telephone TEL20 that the line to be tested is in busy condition. The circuit is traced as follows: from conductor C902 on which busy tone is present through capacitor C90, make contacts 921, break contacts **503*b* and 343, make contacts 331 to the conductor R, thence to the operator telephone TEL20, and over the previously traced circuit to ground by way of the upper winding of calling bridge relay 320**.

If the line to which the test connector has been extended becomes free during the interval that the wipers of the test connector are held in engagement with the terminals of the line, ground is removed from the TS conductor thereby releasing relays 330 and 410 so that testing may proceed in the manner next described.

*The testing process*

The test selector forming the preferred embodiment of my invention includes means for conducting a series of routine tests on the line which has been selected by the succeeding test switching circuits. This means is effective for consecutively testing the conductors of a line under test for the presence of a foreign EMF, an insulation fault between the line conductors and ground, and for an insulation fault between the conductors. The apparatus is effective to return one, two or three flashes on supervisory lamp LP21 in the wire chief's position, and two, four or six clicks over the wire chief's telephone TEL20 in the event that the line fails to pass the first, second or third tests, respectively. In the event that the line under test undergoes all the above tests without indicating a fault, the apparatus is effective for transmitting four flashes on lamp LP20 and eight clicks to the telephone TEL20.

Assuming that the line under test is in idle condition and that toll relay 620 and CF relay 920 have operated in the previously described manner, transfer relay 650 is operated over the following circuit: from ground through make contacts 611 and M102, break contacts 861, make contacts 621 and 624, break contacts 641, and the winding of relay 650 to battery. The operation of relay 650 is effective for closing a holding circuit for itself from battery through the winding of relay 650, make contacts 653, break contacts 634, make contacts 624 and 621, break contacts 861, and make contacts M102 and 611 to ground. With relays 620 and 650 in operated condition, the circuit is now in condition to conduct the above described series of tests.

These tests are effected by placing detecting means comprising the winding of line test relay 640 in its operated condition through a selectable number of dropping resistances R60—R69. The number of dropping resistances included in the operating circuit is determined by the setting of the resistance selection switch S60. Following the operation of relay 640, the operating circuit is opened and the relay 640 winding connected to the conductors of the line under test in a manner to be described presently. A fault condition is indicated by the failure of relay 640 to release within a predetermined time following its connection to the line conductors. When relay 640 is held in its operated condition, the normal sequence of testing is interrupted at the point at which the failure occurs, thereby indicating the failure to the wire chief position.

The means comprising relays 830–860, inclusive, which were used in the previously described manner for registering the number of subscriber line directory number digits transmitted to the test connectors are reused for advancing the test apparatus through its cycle of operations and for connecting the test apparatus to the conductors TT and TR which have been connected to the line under test through the wipers of the test connector.

*Foreign E. M. F. test.*—After the test selector has been placed in testing condition, the next two ground impulses transmitted to the test selector over the 30 impulse per minute conductor 30 IPM are effective for driving the test apparatus through a foreign E. M. F. test on the line being tested for faults. In response to the operation of relay 620, the first ground impulse present on the 30 IPM conductor is effective for reoperating relay 530. This path is traced as follows: from conductor 30 IPM through make contacts 402, break contacts 335 and 317, make contacts 526, break contacts 726, and the lower winding of relay 530 to battery. Relay 530 thereupon operates.

The operation of relay 530 is effective for completing an operating circuit for relay 640, the path being traced from ground through break contacts 841, the winding of relay 640, break contacts 845, make contacts 631, break contacts 843 and make contacts 922 to battery. Relay 640 thereupon operates. The operation of relay 530 is also effective for completing an operating circuit for PA relay 1000 which is traced from battery through the winding of relay 1000, break contacts 833, make contacts 633, 624 and 621, break contacts 861, and make contacts M102 and 611 to ground.

The operation of relay 1000 is effective for applying ground to one terminal of the lower windings of relays 830–860, inclusive, from make contacts 611 and M102, break contacts 801, 601 and 822, make contacts 622 and 1001 to the terminals of the lower windings of relays 830–850 inclusive. The operation of relay 1000 is also effective at this time for extending ground connected to the right-hand winding terminal of relay 1000 through make contacts 1002 and break contacts 836 to the left-hand terminal of the lower winding of relay 830, thereby preventing the operation of relay 830 at this time.

At the conclusion of the first signal transmitted over conductor 30 IPM, the operating circuit for relay 530 is opened. Thereupon relay 530 releases, opening the previously traced energizing circuit for the relay at make contacts 631 and the energizing circuit for relay 1000 at make contacts 633. The opening of make contacts 633 is effective for removing the shorting ground from the left-hand terminal of the lower winding of relay 830 which thereupon operates sufficiently to close make contacts 837. Relay 830 thereupon operates in the previously described manner to open the holding circuit for relay 1000.

During the time that relay 1000 is operated and relay 530 is released, the winding of operated relay 640 is connected between ground and the conductors of the line under test by way of conductors TT and TR over the following circuit: from ground through break contacts 841, the winding of relay 640, break contacts 845, wiper S61, as many of the dropping resistors R60—R69 as are required for the test (in the case shown, resistors R61 and R60), make contacts 904, and break contacts 913 to conductor TR1; and through the above traced circuit including the winding of relay 640 and the resistances R61 and R6, through break contacts 751, make contacts 521 and 902, and break contacts 911 to conductor TT1. Conductors TT1 and TR1 have previously been connected to the conductors of the line under test by way of the wipers of the test connector switch. In the event that a foreign potential exceeding a certain critical value determined by the position of wiper S61 is present on either or both the conductors, sufficient current to hold relay 640 flows through the above traced circuit thereby preventing the release of relay 640 at this time, thus indicating a fault condition. In the event that the voltage present on the conductors of the line under test is not sufficient to hold relay 640 operated, relay 640 releases at this time and allows the test apparatus to be cycled through its next step.

Assuming that the voltage present on the line conductors under test is insufficient to hold relay 640 in operated condition and that the relay has released, the second impulse present on conductor 30 IPM is effective for reoperating relay 530 over the previously traced circuit comprising make contacts 402. The operation of relays 530 and 830 is effective for closing an operating circuit for relay 1010. This operating circuit is traced as follows: from battery through the winding of relay 1010, break contacts 847, make contacts 834, 633, 624 and 621, break contacts 861, and make contacts M102 and 611 to ground. Relay 1010 thereupon operates and is effective as in the manner described in connection with the registration of digits for shorting out the winding of relay 840 at make contacts 1011.

The operation of relays 530, 830 and 650 is effective for causing the second signal transmitted over conductor 30 IPM to operate relay 410. The circuit is traced from conductor 30 IPM, through make contacts 402, break contacts 335 and 317, make contacts 526, break contacts 726, make contacts 732, 551 and 533, break contacts 319, and the upper winding of relay 410 to battery. Relay 410 operates and thereby establishes a holding circuit for itself from conductor 30 IPM, through make contacts 402 and 319*a* and the upper winding of relay 410 to battery. Thus, relay 410 is maintained in its operated condition throughout the transmission of the ground impulse over conductor 30 IPM and is released upon the termination of the impulse.

The operation of relay 410 is effective for passing back a single flashing signal to the operator by completing a circuit for energizing supervisory lamp LP21. The circuit is traced from ground transmitted over conductor 30 IPM, through make contacts 402, break contacts 335, make contacts 318 and lamp LP21 to battery. The operation of relay 410 is also effective for reversing the direction of current flow within the previously described energizing loop for transmitter T of the operator telephone TEL20. This reversal causes the first of a first pair of audible clicks in the receiver (not shown) of the telephone.

The reoperation of relay 530 is effective in the previously described manner for completing the above traced operating circuit comprising make contacts 631 for relay 640.

The operation of relays 530, 640 and 830 are effective for opening the operating and holding circuits for relay 650 at contacts 634, 641 and 832, respectively, thereby releasing relay 650.

Upon the removal of the second ground impulse signal from conductor 30 IPM, relay 530 releases thereby opening the above traced operating circuit for relay 1010 at make contacts 634. The removal of ground from the right-hand terminal of the winding of relay 1010 is effective for bringing about the operation of relay 840 in the manner described in connection with the registration of digits.

The release of relay 530 is effective for opening the operating circuit for relay 640 at make contacts 631. Thereafter, during the time that relay 1010 is operated, relay 640 is connected in series with the conductors of the line under test. The path is traced as follows: from ground through break contacts 841, the winding of relay 640, break contacts 845, conductor S61, the dropping resistors; here the circuit branches. The first branch is extended by way of make contacts 913 over conductor TR1 and the wipers of the test connector switch to the line conductor of the line under test. The second branch extends through break contacts 752, make contacts 521 and 912, conductor TT, the wiper of the test connector to the other conductor of the line under test. As in the previously described case, if sufficient foreign potential is present on the conductors of the line under test, current sufficient to hold relay 640 in an operated condition flows in the above traced circuit so that relay 640 is maintained in its operated condition.

The removal of the signal from conductor 30 IPM releases relay 410 to open the flashing circuit for lamp LP21 at make contacts 318 and restore the direction of current flow through transmitter T to its normal direction thereby causing the second of the previously mentioned first pair of audible clicks in the receiver of the telephone TEL20.

*Test for insulation.*—Assuming that no foreign EMF fault condition exists on the line under test, relay 640 is released thereby reclosing the previously traced operating circuit for relay 650 at break contacts 641. The next (third) appearance of a signal on conductor 30 IPM is effective for reoperating relay 530 over the previously traced operating circuit including make contacts 402. The operation of relays 830, 650 and 530 are effective for further extending the ground signal transmitted over conductor 30 IPM to the upper winding of relay 410 over the previously traced circuit comprising break contacts 317. Relay 410 thereupon reoperates causing a second flashing operation of lamp LP21 and the first of a second pair of audible clicks in the receiver of telephone TEL20.

The operation of relays 530 and 840 is effective for reoperating relay 1000 over a circuit including contacts 848 described in connection with the registration of the impulses. The operation of relay 1000 is effective for shorting out the upper winding of relay 850 by extending ground to the lower right-hand winding of that relay from make contacts 1002 in the previously described manner.

At the conclusion of the third signal transmitted over conductor 30 IPM, after relay 530 has again released, the short around the lower winding of relay 850 is opened allowing that relay to operate and relay 1000 to release. Relay 400 again releases to de-energize lamp LP21 and to cause the second of the above referred to second pair of audible clicks in the receiver of telephone TEL20.

Following the release of relay 530 upon the removal of the signal from conductor 30 IPM and during the time that relay 1000 is still operated, the winding of relay 640 is connected between battery extended through make contacts 922 and 846 and the conductors of the line under test over the previously traced circuit. In the event that the resistance between the conductors of the line under test and ground is sufficiently low to allow enough current to flow through the previously traced circuit of the winding of relay 640, relay 640 is held in its operated condition to indicate a fault.

*Test for insulation resistance between line conductors.*— Assuming that relay 640 releases to indicate satisfactory insulation resistance on the line under test, the application of the next (fourth) impulse transmitted over conductor 30 IPM is effective for operating relays 530 and 1010 in the previously described manner. Thus, relay 650 releases and relay 640 operates in the previously described manner. In response to the operation of relay 850, conductor TT1 leading to one of the two conductors of the line under test is disconnected from wiper S61 at break contacts 751 and is connected to ground at make contacts 752. Thereafter, upon the removal of ground from conductor 30 IPM, relay 530 releases to connect the winding of relay 640 between battery supplied to the right-hand winding terminal through make contacts 846 and ground connected to the line under test at contacts 752 through the leakage resistance of the line and the previously traced circuit between conductor TR1 and the winding of relay 640. As in the previous test, leakage resistance between the conductors of the line under test below an acceptable minimum value is effective for maintaining relay 640 in its operated condition to indicate a fault.

Prior to the release of relay 530, the presence of a signal on conductor 30 IPM is effective for operating relay 410 over the previously traced path. The operation of relay 410 is effective in the previously described manner to cause a flashing operation of lamp LP21 and the first of a third pair of audible clicks to be heard at telephone TEL20. The removal of the fourth impulse from conductor 30 IPM is effective in the previously described manner to release relay 410. Thereupon the second of the above referred to third pair of clicks is heard at the receiver of telephone TEL20 and the lamp LP21 is extinguished.

Assuming that that the relay 640 releases after the performance of the leakage resistance test, relay 530 is released to bring about the operation of relay 860 and thereafter the release of relay 1010 in the previously described manner. The operation of relay 860 is effective for opening the operating circuit of relay 620 at break contacts 1023. The release of relay 620 is effective for removing ground from the lower winding terminals of relays 830–860, inclusive. The latter relays thereupon release.

*Release of the line under test*

Upon the completion of the above described series of tests on a particular line, the test connector may be released. Because the apparatus involved in the release operation does not form a part of my invention, the process is described here only in general terms. Thus, in order to release the switch train, the operator at the test position shown in Fig 2A restores key K20 to its normal position, thereby disconnecting telephone TEL20 from the previously described operating circuit of relay 320 at make contacts K201 and K202. The resulting release of calling bridge relay 320 is effective for restoring release delay relay 510 and consequently release delay repeater relay 400 to their normal positions. The restoration of relays 500 and 510 is effective for restoring other operated relays and for completing an operating circuit for the release means comprising release magnet MZ10 associated with the test selector. The operation of magnet MZ10 is effective for restoring the selector switch wiper set to its normal position, thereby removing the connection between conductor C1003 and the conductor extending to the succeeding test connector which has been effective up to this time to hold the test connector in its operated condition. The test connector thereupon releases.

While I have shown and described a particular embodiment of my invention, it will be obvious to those skilled in the art that changes and modifications may be made without departing from my invention in its broader aspects. I therefore aim in the appended claims to cover all such changes and modifications as fall within the true spirit and scope of my invention.

What is claimed is:

1. In a telephone system, a plurality of lines of a first class, a plurality of lines of a second class, apparatus to be connected to any one of said lines of either first or second class, means comprising a first switch train for establishing connections from said apparatus to any one of said first plurality of lines and a second switch train for establishing connections from said apparatus to any one said second plurality of lines, a selector including a switch to be directively operated for seizing either one of said switch trains, means for transmitting a succession of directive signals to said selector, means within said selector operative in response to the operation of said signal transmitting means for operating said selector and thereafter repeating directive signals to the selected one of said switch train, and other means operative in response to the seizure of said first switch train and to a predetermined number of subsequent operations of said repeating means for rendering said repeating means inoperative whereby certain final ones of a succession of signals transmitted to said selector are absorbed within said selector.

2. The system set forth in claim 1 and having in addition means operative in response to the seizure of said second switch train for rendering said other means inoperative whereby an indefinite number of signals transmitted to said selector are sent forward into said second switch train.

3. In a telephone system, a plurality of lines of a first class, a plurality of lines of a second class, each of said lines having a unique designation comprising a number of digits, the first of said digits of each of said second class of lines being identical to each other and different from the first of said designation digits of said first class of lines, means for testing said lines for fault conditions, means comprising a first plurality of switch trains and means comprising a second plurality of switch trains for establishing connections between said testing means and any one of said first and said second classes of lines respectively, a selector to be directively operated for seizing any one of said switch trains, means for transmitting to said selector a succession of signals corresponding to said designation digits of the one of said lines to be tested, means in said selector operative in response to the operation of said signal transmitting means for repeating signals to said selector and a subsequently seized one of said switch trains, means operative in response to the operation of said selector caused by an operation of said repeating means corresponding to any one of said first designation digits of said first plurality of lines for causing said selector to seize the corresponding one of said first switch train, means operative in response to a first operation of said selector caused by an operation of said repeating means corresponding to said first designation digit of said second class of lines for preparing said selector for seizing one of said second switch trains, means operative in response to the operation of said preparing means for causing said selector to drop back, means operative in response to a second operation of said selector caused by a second operation of said repeating means corresponding to the next suceeding digit of any one of said second plurality of lines for causing said selector to seize one of said second switch trains, and other means operative after the seizure of any one of said switch trains and to a predetermined number of operations of said repeating means for rendering said repeating means inoperative.

4. The system set forth in claim 3 wherein said preparing means is operative for rendering said other means ineffective.

5. The system set forth in claim 3 wherein said preparing means is operative for rendering said other means ineffective, and having in addition means responsive to the operation of said other means caused by an operation of said repeating means corresponding to the last of said line designation digits for rendering said testing means operative.

6. In a telephone system, a plurality of lines of a first class, a plurality of lines of a second class, each of said lines having a unique designation comprising a number of digits, the first of said digits of said second class of lines being identical to each other and different from the first of said first designation digits of said first class of lines, means for testing said lines for fault conditions, means comprising a first plurality of switch trains and means comprising a second switch train for establishing connections from said testing means to any one of said first and said second classes of lines respectively, a selector to be directively operated for seizing any one of said switch trains, means for transmitting to said selector a succession of signals corresponding to said designation digits of the one of said lines being tested, means operative in response to the operation of said signal transmitting means for repeating signals to said selector and a subsequently energized one of said switch trains in order to operate said selector and the seized one of said switch trains, other means operative in response to the seizure of one of said switch trains and to a predetermined number of subsequent operations of said repeating means for rendering said repeating means inoperative, and means operative in response to an operation of said selector caused by an operation of said repeating means corresponding to said first designation digit of said second class of lines for rendering said other means ineffective.

7. In a telephone system, a plurality of lines of a first class, a plurality of lines of a second class, means for testing said lines for fault conditions, means comprising a first plurality of switch trains and means comprising a second plurality of switch trains for establishing connections between said testing means and any one of said first and said second classes of lines respectively, each of said first switch trains being operative in response to a first number of directive signals, each of said second switch trains being operative in response to a second number of directive signals, a selector to be directly operated for seizing and thereafter controlling any one of said switch trains, means for transmitting directive signals to said selector, means within said selector for repeating directive signals to a seized one of said switch trains, means operative following the seizure of any one of said switch trains for thereafter counting the number of operations of said repeating means, said counting means comprising a plurality of relays having a normal condition and operative in a cycle of successive unique combinations including a first particular combination in response to the second particular number of operations of said repeating means required to operate one of said second switch trains and a second particular combination in response to the number of operations of said repeating means required to operate any one of said first switch trains, said relays operated in said first particular combination being effective for rendering said repeating means ineffective to repeat subsequently transmitted signals to a seized one of said switch trains, other means operative in response to the operation of said relays in said second particular combination for rendering said testing means effective, means operative in response to the operation of said selector to seize any one of said second switch trains and to the operation of said relays in said second particular combination for causing said relays to assume said first operated condition, said testing means comprising an element for detecting fault conditions on a line, said relays being cyclically operative to each of said conditions for connecting said elements in a variety of ways to the one of said lines being tested in order to perform a series of tests, and means operative in response to the operation of said other means for cyclically operating said relays.

8. In a telephone system, a plurality of lines, means for testing said lines for fault conditions, means comprising a switch train for establishing a connection between said testing means and any one of said lines, a selector for seizing and thereafter controlling said switch train, means for transmitting directive signals to said selector, means within said selector for repeating signals transmitted to said selector to said switch train, means operative in response to each operation of said repeating means for counting the number of operations of said repeating means, said counting means comprising a plurality of relays having a normal condition and operative in a cycle of successive unique combinations including a first and a second particular combination, said relays operated in said first unique combination being effective for rendering said repeating means ineffective to repeat further signals to said switch train, other means operative in response to the operation of said relays in said second particular combination for rendering said testing means effective and for thereafter restoring said relays to said normal condition, said testing means comprising an element for detecting fault conditions on the one of said lines to which a connection has been established, said relays being operative through their cycle for connecting said element in a variety of ways to the one of said lines being tested in order to perform a series of tests, and means operative in response to the operation of said other means for cyclically operating said relays.

References Cited in the file of this patent

UNITED STATES PATENTS

| | | |
|---|---|---|
| 1,945,467 | Friendly | Jan. 30, 1934 |
| 2,020,953 | McClew | Nov. 12, 1935 |
| 2,541,936 | Powell | Feb. 13, 1951 |
| 2,623,956 | Kessler et al. | Dec. 30, 1952 |

UNITED STATES PATENT OFFICE

CERTIFICATE OF CORRECTION

Patent No. 2,806,093 September 10, 1957

William W. Pharis

It is hereby certified that error appears in the printed specification of the above numbered patent requiring correction and that the said Letters Patent should read as corrected below.

Column 1, line 25, for "switch" read --switching--; column 10, line 29, for "shortening" read --shorting--; column 18, line 2, for "directly" read --directively--.

Signed and sealed this 12th day of November 1957.

(SEAL)
Attest:

KARL H. AXLINE

Attesting Officer

ROBERT C. WATSON
Commissioner of Patents